(12) United States Patent
Margolin et al.

(10) Patent No.: US 11,755,846 B1
(45) Date of Patent: Sep. 12, 2023

(54) EFFICIENT TAGGING OF TRAINING DATA FOR MACHINE LEARNING MODELS

(71) Applicant: INTUIT INC., Mountain View, CA (US)

(72) Inventors: Itay Margolin, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/050,973

(22) Filed: Oct. 28, 2022

(51) Int. Cl.
*G06F 40/40* (2020.01)
*G06F 16/35* (2019.01)
*G06F 40/284* (2020.01)

(52) U.S. Cl.
CPC .............. *G06F 40/40* (2020.01); *G06F 16/35* (2019.01); *G06F 40/284* (2020.01)

(58) Field of Classification Search
CPC ......... G06F 40/40; G06F 16/35; G06F 40/284
USPC .............................................................. 704/9
See application file for complete search history.

(56) References Cited

U.S. PATENT DOCUMENTS

2019/0108593 A1* 4/2019 Yadav ................... G06F 16/355

* cited by examiner

*Primary Examiner* — Thierry L Pham
(74) *Attorney, Agent, or Firm* — DLA PIPER LLP (US)

(57) ABSTRACT

Methods and systems for efficiently generating tagged training data for machine learning models. In conventional systems, all of the raw data (e.g., each sentence) has to be manually tagged. Instead, the methods and systems generate a representative sample for multiple portions of raw data, e.g., a representative sentence for multiple, similar sentences. Only the representative sample is tagged and used for training, thereby realizing a significant efficiency in both tagging the data and training the machine learning models.

20 Claims, 5 Drawing Sheets

|  | Sequence$_1$ | Sequence$_2$ | Sequence$_3$ | ........................ |  | Sequence$_n$ |
|---|---|---|---|---|---|---|
| Sequence$_1$ | 0 | d$_{12}$ | d$_{13}$ | ... ... ... | ... ... ... | d$_{1n}$ ... |
| Sequence$_2$ | d$_{21}$ | 0 |  | ... ... | ... ... | ... ... |
| Sequence$_3$ | d$_{31}$ |  | 0 | ... ... | ... ... | ... ... |
| ... | ... | ... |  | ... ... | ... ... | ... ... |
| ... | ... | ... | ... | ... ... | ... ... | ... ... |
| ... | ... | ... | ... | ... ... | ... ... | ... ... |
| ... | ... | ... | ... | ... ... | ... ... | ... ... |
| ... | ... | ... | ... | ... ... | ... ... | ... ... |
| ... | ... | ... | ... | ... ... | ... ... | ... ... |
| ... | ... | ... | ... | ... ... | ... ... | ... ... |
|  |  |  | ... | ... |  |  |
| Sequence$_n$ | d$_{n1}$ |  |  |  |  | 0 |

EFFICIENT TAGGING OF TRAINING DATA FOR MACHINE LEARNING MODELS

BACKGROUND

Machine learning models have been widely used in applications such as natural language processing. These models are trained to determine semantic and syntactic meanings of words, phrases, clauses, and even sentences and paragraphs. For example, machine learning models are used for sentiment analysis where a sentence is determined to have a positive sentiment, a negative sentiment, or a neutral sentiment.

A major bottleneck for training machine learning models for natural language processing is the availability of training data. There has always been the need for fast and accurate tagged training data for training models. Currently, the training data has to be manually tagged. For example, in the context of sentiment analysis, different sentences in text are tagged by a human to indicate whether each sentence emotes a positive, negative, or neutral sentiment. Such manual tagging is a slow, cumbersome, and inefficient process, which is undesirable.

As such, a significant improvement on generating training data for machine learning models is therefore desired.

SUMMARY

Embodiments disclosed herein solve the aforementioned technical problems and may provide other technical solutions as well. In one or more embodiments, representative natural language text (e.g., a representative sentence) is determined from raw text data. For example, similar sentences are clustered together, and a single sentence is selected as the representative of the cluster. The representative sentence is then manually tagged to be used for training a model. Because there is no need for manually tagging each sentence individually, the time and the cost of generating tagged training data decreases significantly. In other words, the embodiments facilitate an efficient generation of training data for machine learning models, particularly for natural language processing.

In an embodiment, a method is provided. The method comprises generating a plurality of sequences of tokens from raw text data to be tagged for generating training data for a machine learning model and calculating distances between each pair of the sequences of the tokens. The method also comprises training, using the calculated distances, an embedding layer to map the plurality of sequences of tokens into corresponding vector representations and clustering the vector representations to generate a plurality of clusters. The method further comprises selecting a vector representation from each cluster of the plurality of clusters and tagging text associated with the selected vector representation to generate the training data for the machine learning model.

In another embodiment, a system is provided. The system comprises a non-transitory storage medium storing computer program instructions; and one or more processors configured to execute the computer program instructions to cause the system to perform operations. The operations comprise generating a plurality of sequences of tokens from raw text data to be tagged for generating training data for a machine learning model and calculating distances between each pair of the sequences of the tokens. The operations also comprise training, using the calculated distances, an embedding layer to map the plurality of sequences of tokens into corresponding vector representations and clustering the vector representations to generate a plurality of clusters. The operations further comprise selecting a vector representation from each cluster of the plurality of clusters and tagging text associated with the selected vector representation to generate the training data for the machine learning model.

DETAILED DESCRIPTION OF SEVERAL EMBODIMENTS

One or more embodiments disclosed herein are directed to efficiently generating tagged training data for machine learning models. In conventional system, all of the raw data (e.g., each sentence) has to be manually tagged. Instead, the disclosed embodiments generate a representative sample for multiple portions of raw data, e.g., a representative sentence for multiple, similar sentences. Only the representative sample is tagged and used for training, thereby realizing a significant improvement in processing efficiency in both tagging the data and training the machine learning models.

The representative sample is generated by an unsupervised approach, i.e., no labeled data is needed to generate the sample. First, the raw text data is encoded (e.g., using a byte pair encoding algorithm) and tokenized based on the encoding. The tokenization generates a plurality of sequences of tokens, e.g., one sequence for a sentence. Distances between the sequences of tokens are calculated to generate a distance matrix. Using the distance matrix, an embedding layer of a deep learning model is trained to map sequences of tokens with smaller distances to similar vector representations. The vector representations are clustered, e.g., using k-means clustering. For each cluster, a representative sample is selected, e.g., by random sampling or by picking a sample closer to the centroid. The portion of the text corresponding to the representative sample is then manually tagged for training the machine learning model.

Figure 1:
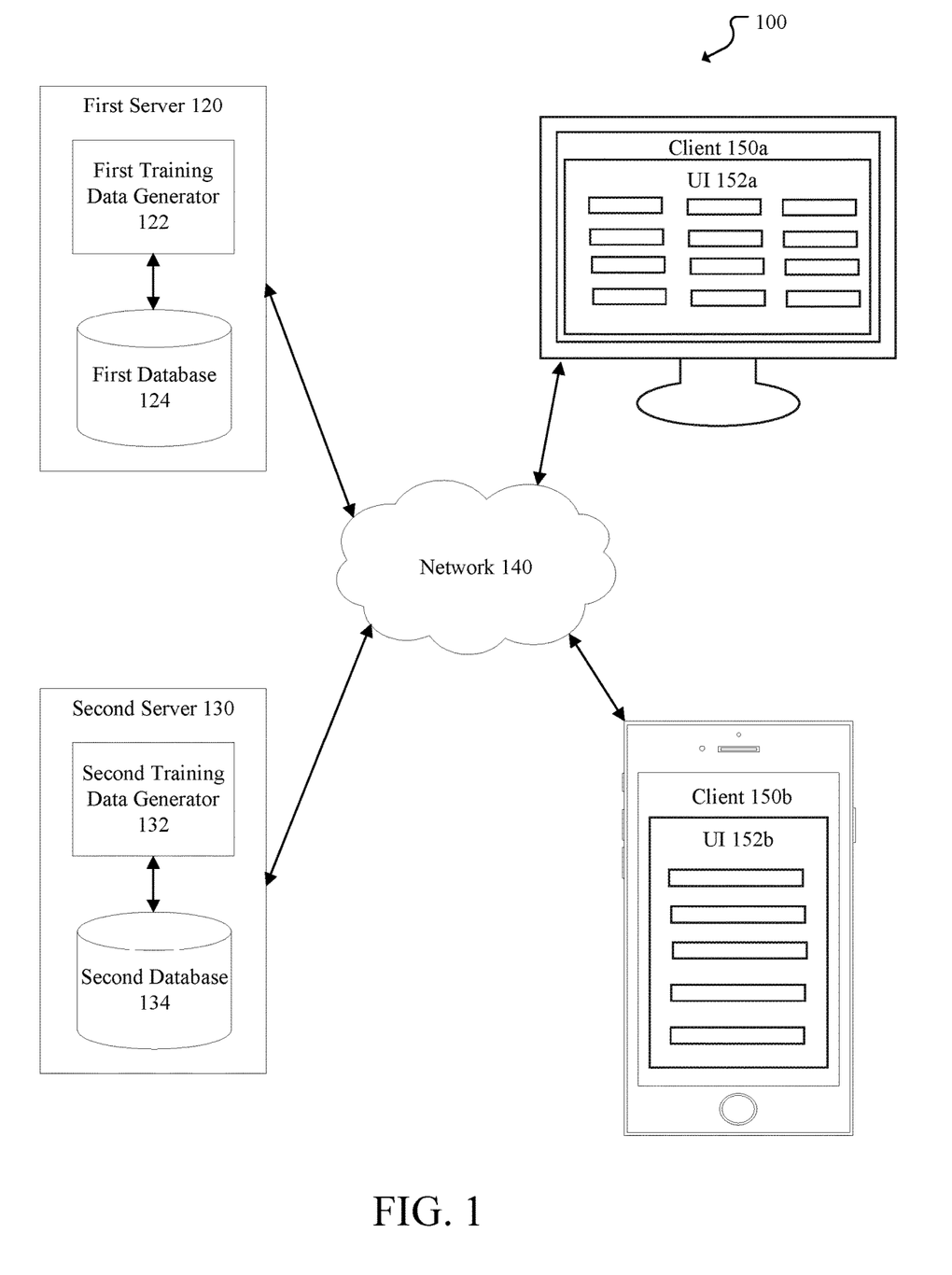
FIG. 1 shows an example of a system configured for an efficient generation of training data for machine learning models based on the principles disclosed herein.

FIG. 1 shows an example of a system 100 configured for an efficient generation of training data for machine learning models based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150") and servers 120, 130 interconnected through a network 140. The first server 120 hosts a first training data generator 122 and a first database 124 and the second server 130 hosts a second training data generator 132 and a second database 134. The client devices 150*a*, 150*b* have user interfaces 152*a*, 152*b*, respectively, (collectively referred to herein as "user interfaces (UIs) 152") which may be used to communicate with the training data generators 122, 132 using the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs. The client devices 150 may generally be used by administrative and specialized users to train machine learning models (e.g., natural language processors), which also can be hosted by the serves 120, 130. In one or more embodiments, the users interact with the training data generators 122, 132 to generate training data for training the models. The interactions may include, for example, identifying source documents to be used, commands for the training data generators 122, 132 to generate a representative sample to be tagged, and tagging information for the representative sample.

Each of the training data generators 122, 132 perform the different operations described throughout this disclosure. For instance, the training data generators 122, 132 retrieve and or receive raw text data. The training data generators 122, 132 then encode and tokenize the raw text data to generate a plurality of sequences of tokens. The training data generators 122, 132 calculate distances between each pair of the plurality of sequences of tokens to generate a distance matrix. Using the distance matrix, the training data generators 122, 132 train an embedding layer of a deep learning model to generate vector representations of the plurality of sequences of tokens, where the vector representations for sequences of tokens with less distances between them are similar. The vector representations are then clustered by the training data generators 122, 132 and a sample for each cluster is selected. The selected sample is then manually tagged to generate training data. Once generated, the training data is stored in the corresponding databases 124, 134.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
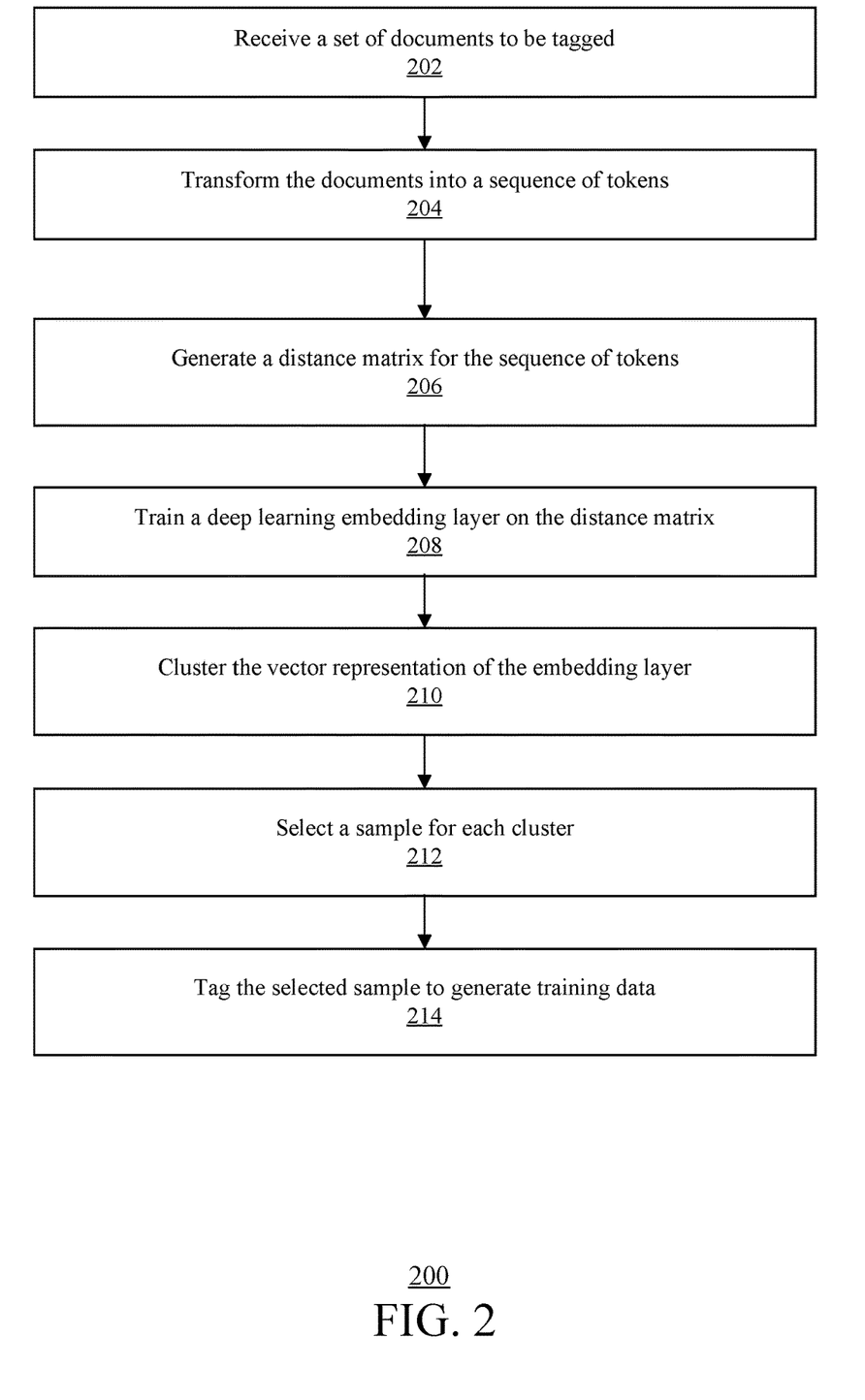
FIG. 2 shows a flow diagram of an example method of an efficient generation of training data for machine learning models based on the principles disclosed herein.

FIG. 2 shows a flow diagram of an example method 200 of an efficient generation of training data for machine learning models based on the principles disclosed herein. For example, the method 200 can be used to efficiently generate tagged data for natural language processors. It should be understood that the steps of the method 200 are merely intended as examples and should not be considered limiting. Furthermore, the illustrated sequence of steps is used explanation purposes, and should not be considered limiting. That is, methods with additional, alternate, of fewer number of steps should also be considered within the scope of this disclosure. One or more steps of the method 200 may be performed by one or more components of the system 100 shown in FIG. 1.

The method 200 begins at step 202, where a set of documents to be tagged is received. The documents may come from any source. For example, the documents may comprise text extracted by optical character recognition (i.e., OCR'ed documents), a transcript of calls to a help center, a feed of newspaper articles, text extracted by web crawling, social media posts, etc. In an example embodiment, the tagging of the document is to identify a sentiment (positive, negative, or neutral) expressed at different portions of the document. For instance, the tagging can be done on a sentence-by-sentence basis, or a paragraph-by-paragraph basis.

The subsequent steps of the method 200 is for making the tagging more efficient by reducing the number of documents that are to be manually tagged. Although the tagging can be performed at different levels of chunking (e.g., word, phrase, sentence, paragraph, page, section, etc.), the following details are made with respect to a sentence level tagging for explanation purposes only.

An underlying assumption is that in many cases of natural language processing (i.e., ordinary classification tasks), the available data (e.g., the text in the documents) is in a relatively closed form of representative samples. In other words, different portions of the text may be connoting a similar meaning or emoting a similar sentiment. For instance, a transcript of a call center may have multiple customers discussing similar issues (e.g., "instructions not clear/too complicated/hard to follow") or expressing similar sentiments about a product (e.g., "this product is awesome/brilliant/easy to use"). The closed form of representative samples allows the tagging of only a subset of documents (e.g., representative sentences) to approach the accuracy of the result achieved by tagging all documents, while being significantly efficient (e.g., less processing required). As a non-limiting example, the following two sentences: (1) "I liked this movie!" and (2) "I really liked this movie!" express the same positive sentiment about the movie. There is no need to manually tag them both because of their similarity. The problem then can be framed as: given a set of documents X with size of N, a subset of documents X' is to be determined, where tagging the subset X' can be used for training a machine learning. The details of generating the subset X', using an unsupervised approach, are discussed below.

At step 204, the documents are transformed into a sequence of tokens. In one or more embodiments, the sequence of tokens is generated based on training a byte pair encoding algorithm, as known in the art. The encoding generated by the algorithm is converted into numerical tokens. Using the numerical tokens, for example, the sentence "I liked this movie!" may map to the sequence of tokens [0,1,2,3] and the sentence "I really liked this movie!" may map to another sequence of tokens [0, 4, 1, 2, 3]. It should be understood that this is just one example of token generation and the sequential arrangement of tokens and should not be considered limiting—any type of token generation and sequential arrangement should be considered within the scope of this disclosure.

Figure 3:
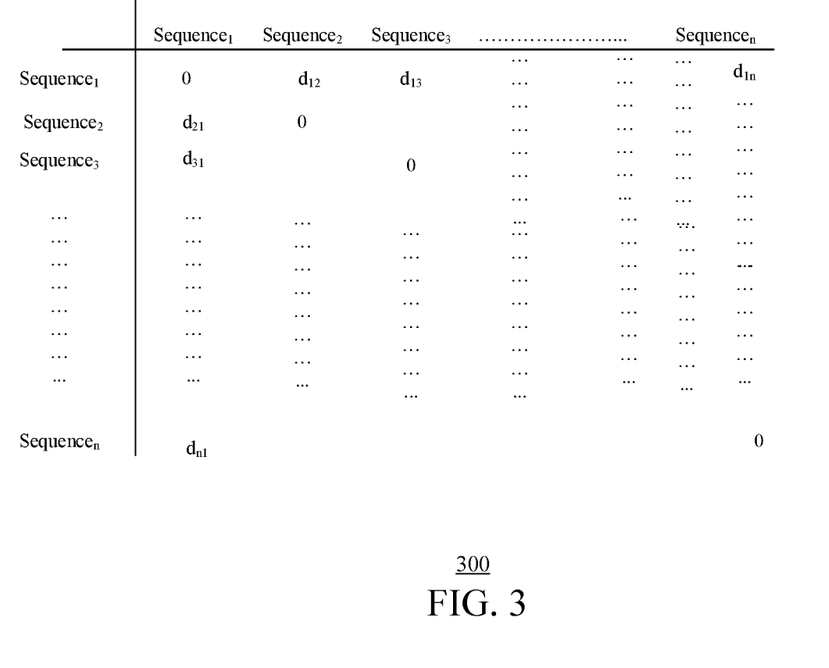
FIG. 3 shows an example of a distance matrix based on the principles disclosed herein.

At step 206, a distance matrix for the sequences of tokens is generated. For N sequences, for example, the size of the matrix is N×N where a cell (i, j) is the distance between Sequence$_i$ and Sequence$_j$. FIG. 3 shows an example of a distance matrix 300 based on the principles disclosed herein. As shown, the leading diagonal of the distance matrix contains 0 because the distances between the same sequence is always 0. The distance between the other sequences can be calculated using one or more distance calculation algorithms.

In one or more embodiments, a bag of words model may be used. The bag of words model compares the occurrence of the words in the corresponding sequences, disregarding the ordering of the words. For example, using the bag of words model, a distance between the sequences [0, 1, 2, 3] and [0, 4, 1, 2, 3] is 1 because there is mismatch of one token (i.e., one word "really") between the two sequences. The bag of words comparison always generates "0" for the leading diagonal because the same sequence is being compared against itself and the tokens completely overlap. Therefore, the leading diagonal is not considered for further processing.

In one or more embodiments, Levenshtein distances can be used for comparing the sequences. A Levenshtein distance between two sequences (a first sequence and a second sequence) is based on the number of operations required to generate the second sequence from the first sequence. The operations include insertions, deletions, or substitutions. For the above example sequences, the Levenshtein distance is also one because a single addition is required to get to the second sequence [0, 4, 1, 2, 3] from the first sequence [0, 1, 2, 3]. The leading diagonal of the comparison matrix 300 contains 0's based on the Levenshtein distance calculation as well because no operations are required for identical sequences of tokens.

The bag of words and the Levenshtein distances are a few examples of comparing sequences of tokens and should not be considered limiting. Any comparison algorithm should be considered within the scope of this disclosure.

At step 208, a deep learning embedding layer is trained on the distance matrix. This training will try to map each sequence of tokens (e.g., representing a sentence) to a vector. Mathematically, the learning is designed to minimize the following loss function:

$$\sum_{j=1, j \neq i}^{n} \sum_{i=1}^{n} (d(E_i, E_j) - M_{i,j})^2$$

That is, the model should learn that the vector representation of two close sequence of tokens (vector representation shown as $E_i$, $E_j$) should also be close in edit distance terms (as indicated by the $M_{i,j}$ distance matrix, e.g., matrix 300 shown in FIG. 3).

Figure 4:
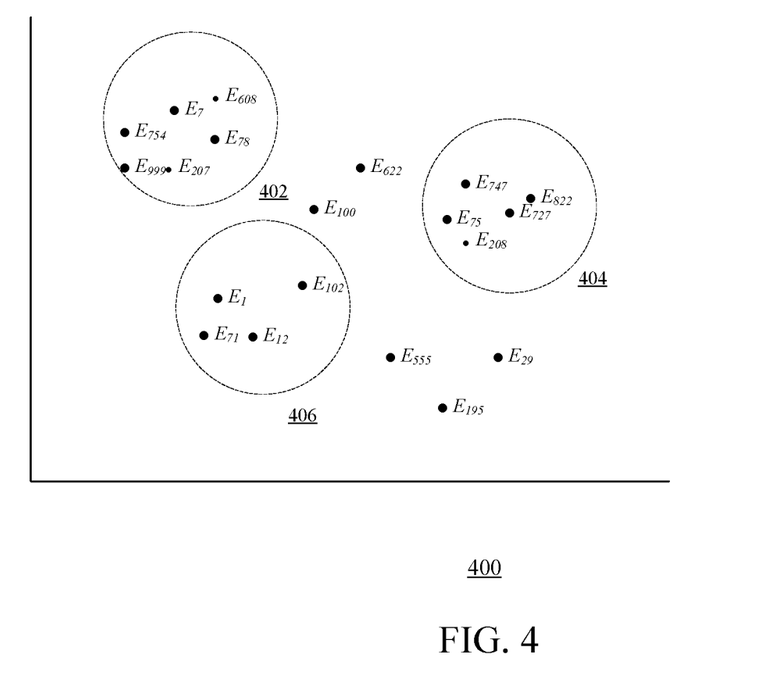
FIG. 4 shows an example of clustering based on the principles disclosed herein.

At step 210, the vector representation of the embedding layer may be clustered. In one or more embodiments, the clustering includes k-means clustering, as known in the art. FIG. 4 shows an example clustering 400 based on the principles disclosed herein. In particular, clusters 402, 404, 406 are shown as part of the illustrated clustering 400. Each cluster 402, 404, 406 contains the representations E that are closer to each other. For example, cluster 402 includes representations $E_{999}$, $E_{754}$, $E_{207}$, $E_7$, $E_{78}$, $E_{608}$.

At step 212, a sample for each cluster is selected. That is, a representation E per each cluster is selected and the sentence corresponding to the representation is retrieved. In some examples, the selection is random, i.e., a representation is randomly selected from each cluster. In other examples, the representation closer to the centroid of the cluster is selected. All the steps above therefore follow an unsupervised approach—there is no need for tagged data to select a sample that has to be tagged.

At step 214, the selected sample is tagged to generate training data. For example, if the selected sample is a sentence for sentiment analysis, the sentence is manually tagged (e.g., positive, negative, neutral) to generate the training data.

Therefore, an efficiency is realized because only a subset of the data is manually tagged. As opposed to having to tag all of the data, a representative is selected for each cluster; and just that representative is manually tagged. An orders of magnitude efficiency gain is achieved compared to conventional systems where all of the data has to be manually tagged. Furthermore, because of the decreased volume of training data, less memory and less processing is sufficient for training the machine learning models. Therefore, embodiments disclosed herein make the computing process more efficient.

Figure 5:
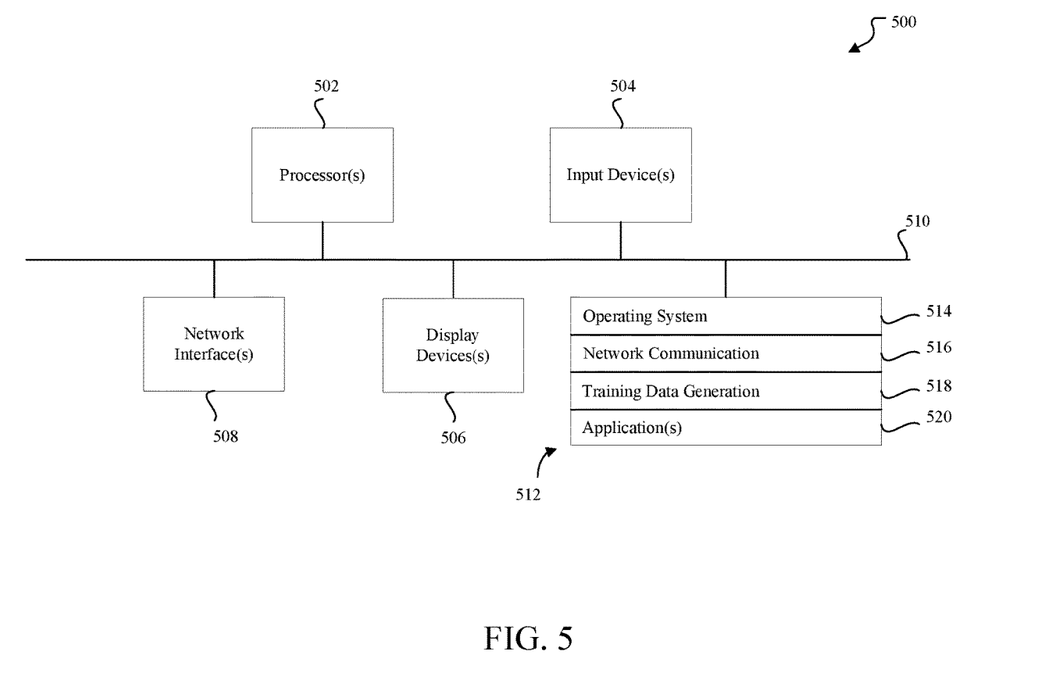
FIG. 5 shows a block diagram of an example computing device that implements various features and processes based on the principles disclosed herein.

FIG. 5 shows a block diagram of an example computing device 500 that implements various features and processes, based on the principles disclosed herein. For example, computing device 500 may function as first server 120, second server 130, client 150a, client 150b, or a portion or combination thereof in some embodiments. The computing device 800 also performs one or more steps of the method 200. The computing device 500 is implemented on any electronic device that runs software applications derived from compiled instructions, including without limitation personal computers, servers, smart phones, media players, electronic tablets, game consoles, email devices, etc. In some implementations, the computing device 500 includes one or more processors 502, one or more input devices 504, one or more display devices 506, one or more network interfaces 508, and one or more computer-readable media 512. Each of these components is be coupled by a bus 510.

Display device 506 includes any display technology, including but not limited to display devices using Liquid Crystal Display (LCD) or Light Emitting Diode (LED) technology. Processor(s) 502 uses any processor technology, including but not limited to graphics processors and multi-core processors. Input device 504 includes any known input device technology, including but not limited to a keyboard (including a virtual keyboard), mouse, track ball, and touch-sensitive pad or display. Bus 510 includes any internal or external bus technology, including but not limited to ISA, EISA, PCI, PCI Express, USB, Serial ATA or FireWire. Computer-readable medium 512 includes any non-transitory computer readable medium that provides instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 includes various instructions 514 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 establish and maintain network connections (e.g., software for implementing communication protocols, such as TCP/IP, HTTP, Ethernet, telephony, etc.).

Training data generation instructions 518 include instructions that implement the disclosed process for generating the training data first by generating representative samples and then manually tagging the representative sample.

Application(s) 520 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, said method comprising:
    generating a plurality of sequences of tokens from raw text data to be tagged for generating training data for a machine learning model;
    calculating distances between each pair of the sequences of tokens;
    training, using the calculated distances, an embedding layer to map the plurality of sequences of tokens into corresponding vector representations;

clustering the vector representations to generate a plurality of clusters;
selecting a single sample vector representation from each cluster of the plurality of clusters; and
tagging text associated with the selected single sample vector representation to generate the training data for the machine learning model while avoiding tagging of text associated with non-selected vector representations.

2. The method of claim 1, wherein generating the plurality of sequence of tokens comprises:
training a byte pair encoding algorithm to encode the raw text data; and
generating the plurality of sequences of token based on the encoded raw text data.

3. The method of claim 1, wherein generating the plurality of sequence of tokens comprises:
generating a sequence of tokens for each sentence of the raw text data.

4. The method of claim 1, wherein calculating the distances between each pair of sequences of tokens comprises:
calculating the distances between each pair of sequences of tokens using a bag of words model.

5. The method of claim 1, wherein calculating the distances between each pair of sequences of tokens comprises:
calculating Levenshtein distances between each pair of sequences of tokens.

6. The method of claim 1, further comprising:
generating a distance matrix based on the calculated distances; and
training the embedding layer using the distance matrix.

7. The method of claim 1, wherein clustering the vector representations comprises:
clustering the vector representations using k-means clustering.

8. The method of claim 1, wherein selecting the single sample vector representation from each cluster comprises:
randomly selecting the single sample vector representation from each cluster.

9. The method of claim 1, wherein selecting the single sample vector representation from each cluster comprises:
selecting the single sample vector representation closer to a centroid of each cluster.

10. The method of claim 1, further comprising:
training the machine learning model using the tagged text.

11. A system comprising:
a non-transitory storage medium storing computer program instructions; and
one or more processors configured to execute the computer program instructions to cause the system to perform operations comprising:
generating a plurality of sequences of tokens from raw text data to be tagged for generating training data for a machine learning model;
calculating distances between each pair of the sequences of tokens;
training, using the calculated distances, an embedding layer to map the plurality of sequences of tokens into corresponding vector representations;
clustering the vector representations to generate a plurality of clusters;
selecting a single sample vector representation from each cluster of the plurality of clusters; and
tagging text associated with the selected single sample vector representation to generate the training data for the machine learning model while avoiding tagging of text associated with non-selected vector representations.

12. The system of claim 11, wherein generating the plurality of sequence of tokens comprises:
training a byte pair encoding algorithm to encode the raw text data; and
generating the plurality of sequences of token based on the encoded raw text data.

13. The system of claim 11, wherein generating the plurality of sequence of tokens comprises:
generating a sequence of tokens for each sentence of the raw text data.

14. The system of claim 11, wherein calculating the distances between each pair of sequences of tokens comprises:
calculating the distances between each pair of sequences of tokens using a bag of words model.

15. The system of claim 11, wherein calculating the distances between each pair of sequences of tokens comprises:
calculating Levenshtein distances between each pair of sequences of tokens.

16. The system of claim 11, wherein the operations further comprise:
generating a distance matrix based on the calculated distances; and
training the embedding layer using the distance matrix.

17. The system of claim 11, wherein clustering the vector representations comprises:
clustering the vector representations using k-means clustering.

18. The system of claim 11, wherein selecting the single sample vector representation from each cluster comprises:
randomly selecting the single sample vector representation from each cluster.

19. The system of claim 11, wherein selecting the single sample vector representation from each cluster comprises:
selecting the single sample vector representation closer to a centroid of each cluster.

20. The system of claim 11, wherein the operations further comprise:
training the machine learning model using the tagged text.

* * * * *